United States Patent
Han et al.

(10) Patent No.: US 9,952,960 B1
(45) Date of Patent: Apr. 24, 2018

(54) METHOD AND APPARATUS FOR ANALYZING HAZARD OF ELEVATOR CONTROL SOFTWARE, AND COMPUTER READABLE RECORDING MEDIUM

(71) Applicant: Sangmyung University Seoul Industry-Academy Cooperation Foundation, Seoul (KR)

(72) Inventors: Hyuk Soo Han, Seoul (KR); EunBi Kim, Seoul (KR)

(73) Assignee: SANGMYUNG UNIVERSITY SEOUL INDUSTRY—ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 15/828,602

(22) Filed: Dec. 1, 2017

Related U.S. Application Data

(63) Continuation of application No. PCT/KR2016/012579, filed on Nov. 3, 2016.

(30) Foreign Application Priority Data

Oct. 19, 2016 (KR) ........................ 10-2016-0135790

(51) Int. Cl.
*B64C 39/02* (2006.01)
*B64C 39/00* (2006.01)
(Continued)

(52) U.S. Cl.
CPC ............ *G06F 11/3608* (2013.01); *G06F 8/10* (2013.01); *G06F 8/433* (2013.01); *G06F 8/75* (2013.01)

(58) Field of Classification Search
CPC ........ G06F 11/3608; G06F 8/10; G06F 8/433; G06F 8/75; F21K 9/00; H01L 2224/1461;
(Continued)

(56) References Cited

U.S. PATENT DOCUMENTS 7,003,766 B1 2/2006 Hong
7,676,483 B2 * 3/2010 Klug ...................... G06Q 10/06
703/6

(Continued)

FOREIGN PATENT DOCUMENTS

KR 20110020520 A 3/2011

OTHER PUBLICATIONS

Paterno et al., ConcurTaskTrees, Feb. 2012, 18 pages.*
(Continued)

*Primary Examiner* — Thuy Dao
(74) *Attorney, Agent, or Firm* — Dinsmore & Shohl LLP

(57) ABSTRACT

A method of analyzing a hazard of a software control system which is operated by a computer and based on STPA (System Theoretic Process Analysis) is provided. The method includes determining an attribute and function demands of the system, analyzing tasks of the system based on the determined attribute and the function demands, generating specification of a relation between the tasks using CTT (Concur Task Tree) method, the CTT method representing a hierarchical relation of a control flow between the tasks, determining at least one of the hazard of the system based on the specification and generating a safety constraint of the system based on the determined hazard. The determining at least one of the hazard of the system uses a guide word mapping table of CTT based STPA.

14 Claims, 11 Drawing Sheets

(51) Int. Cl.
*G05D 1/02* (2006.01)
*G06F 11/36* (2006.01)
*G06F 9/44* (2018.01)
*G06F 9/45* (2006.01)

(58) Field of Classification Search
CPC ....... H01L 2224/00; H01L 2224/48019; B64C 29/0033; B64C 39/024
See application file for complete search history.

(56) References Cited

U.S. PATENT DOCUMENTS

| | | | | |
|---|---|---|---|---|
| 8,752,011 B2* | 6/2014 | Dewan | ................. | G06F 9/4443 717/104 |
| 9,092,162 B2* | 7/2015 | Wey | ........................ | G06F 9/451 |
| 9,170,805 B2* | 10/2015 | Yoshimura | ................ | G06F 8/75 |
| 9,346,547 B2* | 5/2016 | Patrick | ................. | B64C 39/024 |
| 9,580,173 B1* | 2/2017 | Burgess | ................ | B64C 39/024 |
| 9,856,007 B2* | 1/2018 | Egan | ......................... | B64B 1/20 |
| 2003/0097486 A1* | 5/2003 | Eisenstein | ............ | G06F 9/4446 719/317 |
| 2008/0250316 A1* | 10/2008 | Zhang | ................... | G06F 9/4443 715/708 |

OTHER PUBLICATIONS

N. Leveson, An (System-Theoretic Process Analysis) STPA Primer, Aug. 2013, 80 pages.*

Martinie et al., Extending procedural task models by systematic explicit integration of objects, knowledge and information, Aug. 2013, 10 pages.*
Young et al., An integrated approach to safety and security based on systems theory, Feb. 2014, 5 pages.*
Computer Application Design and Experiment, Mar. 2016.
Fabio Paternò, et al., Concur Task Trees (CTT), W3C Working Group Submission, Feb. 2, 2012, pp. 1-12.
Minwoo Kim, et al., NuSTPA : A STPA-based safety analysis tool for PPS, Apr. 2016, pp. 64-65, The Institute of Electronics Engineers of Korea.
Sungryong Do, et al., Hazard Identification and Testcase Design Method based on Use Case and HAZOP, Journal of KIISE, Jun. 2016, vol. 43, No. 6, pp. 662-667.
Eun Bi Kim, et al., A Hazard Identification Process using STPA based on CTT, Dec. 1, 2015, pp. 511-513, Korean Information Science Society.
Eun Bi Kim, et al., Hazard Analysis Process using CTT-based STPA, Feb. 28, 2016.
Nacny G. Leveson, Engineering a Safer World, Systems Thinking Applied to Safety, 2011, MIT Press.
Nancy Leveson, A New Accident Model for Engineering Safer Systems, paper in Safety Sicence, Apr. 2004, vol. 42, No. 4, pp. 237-270.
Fabio Paternò, et al., ConcurTaskTrees: A Diagrammatic Notation for Specifying Task Models in Human-Computer Interaction INTERACT'97, Jan. 1997, pp. 362-369, Springer US.
Fabio Paternò, ConcurTaskTrees: An Engineered Notation for Task Models, The Handbook of Analysis for Human-Computer Interaction, Lawrence Erlbaum Associates, 2003, pp. 483-500.
Korean Office Action dated May 29, 2017.

* cited by examiner

| CTT | | STPA | |
|---|---|---|---|
| OPERATOR NAME (OPERATOR) | MEANING | GUIDE WORD | COMMENT |
| Enabling (T1 >> T2) | The second task T2 cannot start until the first task T1 is completed. | Not providing | - T1 has a problem and T2 is performed.<br>- T1 is performed but T2 is not performed. |
| | | Providing Causes | - N/A |
| | | (Provide) Too late or Too Early | - T2 starts before the completion of T1. (T1: Too late, T2: Too Early) |
| | | (Stopped) Too Soon or (Applied) Too long | - N/A |
| Choice (T1 [] T2) | Two tasks T1 and T2 are all available. However, when one of the two tasks T1 and T2 starts, the other task cannot be performed. | Not providing | - Both T1 and T2 cannot be performed.<br>- Both T1 and T2 are concurrently performed (parallel). |
| | | Providing Causes | - N/A |
| | | (Provide) Too late or Too Early | - N/A |
| | | (Stopped) Too Soon or (Applied) Too long | - N/A |
| Enabling with Information passing (T1 []>> T2) | The second task T2 cannot start until the first task T1 is completed and the information of the first task T1 must be inputted to the second task T2. | Not providing | - T1 has a problem and T2 is performed.<br>- T1 is performed but T2 is not performed.<br>- T2 is performed with missing information. |
| | | Providing Causes | - Erroneous information is transmitted. |
| | | (Provide) Too late or Too Early | - T2 starts before the completion of T1. (T1: Too late, T2: Too Early)<br>- T2 starts before receiving information from T1. |
| | | (Stopped) Too Soon or (Applied) Too long | - N/A |
| Concurrent Tasks (Interleaving) (T1 ||| T2) | Two tasks T1 and T2 can be performed at any order and one task must be performed until the other | Not providing | - Both T1 and T2 cannot be performed.<br>- Only one of T1 or T2 is performed (choice). |

FIG. 2A

| | | | |
|---|---|---|---|
| | task is completed. (The two tasks can be concurrently performed.) | Providing Causes | - N/A |
| | | (Provide) Too late or Too Early | - N/A |
| | | (Stopped) Too Soon or (Applied) Too long | - N/A |
| Concurrent Communication Tasks (Synchronization) (T1 |[]| T2) | Two tasks T1 and T2 are concurrently performed and the two tasks T1 and T2 can share the information | Not providing | - Both T1 and T2 cannot be performed. - Only one of T1 or T2 is performed (choice). - The task is performed with missing information. |
| | | Providing Causes | - Erroneous information is transmitted to T1 or T2. |
| | | (Provide) Too late or Too Early | - The information is transmitted not in time. |
| | | (Stopped) Too Soon or (Applied) Too long | - N/A |
| Disabling (T1 [> T2) | When the second task T2 starts, the first task T1 must be inactivated. | Not providing | - When T2 is performed, T1 is not inactivated. |
| | | Providing Causes | - N/A. |
| | | (Provide) Too late or Too Early | - When T2 is performed, T1 is inactivated late (too late). |
| | | (Stopped) Too Soon or (Applied) Too long | - N/A |

FIG. 2B

| TYPE | TASK | EXPLANATION |
| --- | --- | --- |
| Abstract Task | Summon Car | Car is summoned and car is arrived at destination floor |
| | Boarding | Passenger is get into car and load of car is determined whether load of car exceeds restricted load |
| | Take Car to Destination Floor | Destination floor is requested, the car is moved to destination floor |
| | Check Load | Load of car is calculated, alarm is rung when load of car exceeds restricted load |
| Interaction Task | Pressed Summon Button | Summon button is pressed |
| | Pressed Floor Request Button | Floor request button is pressed |
| | Hold Doors | Open status of doors is held by continuously pushing open button or summon button |
| Application Task | Detect Car Position | Present position of car is detected |
| | Calculate Distance | Distance between present position of car and destination floor is calculated |
| | Move Car | Car is moved |
| | Stop Car | Car is stopped (velocity of car is decreased to zero) |
| | Open Doors | Doors are opened |
| | Check Changed Weight | Changed weight is checked when the load of car is changed |
| | Ring Alarm | When total weight exceeds restricted weight, alarm is rung |
| | Close Doors | Doors are closed |
| User Task | Get into Car | Passenger gets into car |
| | Get off Car | Passenger gets off car |

FIG. 6

| No. | Control Order | Task (Relation) | Not providing | Providing Causes | (Provide) Too late or Too Early | (Stopped) Too Soon or (Applied) Too long |
|---|---|---|---|---|---|---|
| 1 | Stop | Move Car >> Stop Car | The car is not stopped when the car is arrived at the destination floor. | N/A | The car is stopped before the car is arrived at the destination floor. (the car is stopped between floor and floor) | N/A |
| 2 | Open | Stop Car >> Open Doors | The doors are opened before the car is stopped. The doors are not opened when the car is stopped. | N/A | The doors are opened before the car is completely stopped. | N/A |
| 3 | Open | Open Doors >> Get into Car | No hazardous situation | N/A | No hazardous situation | N/A |
| 4 | Open (Hold) | [Hold Doors] ||| Get into Car | The open status of the doors is not held when the passengers get into the car (the hold status is released when boarding) | N/A | N/A | N/A |
| 5 | Load weight | Get into Car ||| Load weight | The load is not checked when the passenger get into the car. | N/A | N/A | N/A |
| 6 | Ring alarm | Check Changed Weight []>> Ring Alarm | The alarm is not rung, although the load of the car exceeds the restricted load. | The alarm is rung due to the erroneous measured value. | No hazardous situation | N/A |
| 7 | Close | Get into Car >> Close Doors | The doors are not closed although all the passengers get into the car. | N/A | The doors are closed when the passenger is getting into the car. | N/A |
| 8 | Close | Load weight >> Close Doors | The doors are closed although the alarm is rung due to the exceeding the restricted load. | N/A | The doors are closed prior to measuring the load of the car. | N/A |
| 9 | Close | Close Doors >> Take Car to Destination Floor | The car is moved to the destination floor without closing the doors | N/A | The car is moved to the destination floor when the doors are not completely closed. | N/A |

FIG. 8

| Control Order | Hazard | Safety Constraint |
|---|---|---|
| Stop | The car is not stopped when the car is arrived at the destination floor. | The car should be stopped when the car is arrived at the destination floor. |
| | The car is stopped before the car is arrived at the destination floor. | The car should not be stopped when the car is moving until the car is arrived at the destination floor. |
| Open | The doors are opened before the car is stopped. The doors are opened before the car is completely stopped. | The doors should not be opened before the car is completely stopped. (The doors should not be opened until the [car speed == 0] |
| | The doors are not opened when the car is stopped. | The doors should be opened when the car is stopped. |
| Open (Hold) | The open status of the doors is not held when the passengers get into the car | The open status of the doors should be held when the passenger is pushing the open button or the summon button. |
| Load weight | The load is not checked when the passenger get into the car. | The load should be checked when the passenger get into the car. |
| | The alarm is not rung, although the load of the car exceeds the restricted load. | The alarm should be rung, when the load of the car exceeds the restricted load. |
| Close | The doors are not closed although all the passengers get into the car. | The doors should be closed when all the passengers get into the car. |
| | The doors are closed when the passenger is getting into the car. | The doors should not be closed when the passenger is getting into the car. |
| | The doors are closed although the alarm is rung due to the exceeding the restricted load. | The doors should not be closed when the load of the car exceeding the restricted load. |
| | The car is moved to the destination floor without closing the doors. The car is moved to the destination floor when the doors are not completely closed. | The car should not be moved to the destination floor until the doors are completely closed. |

METHOD AND APPARATUS FOR ANALYZING HAZARD OF ELEVATOR CONTROL SOFTWARE, AND COMPUTER READABLE RECORDING MEDIUM

CROSS-REFERENCE TO RELATED APPLICATION(S)

This application is a continuation application of PCT/KR2016/012579 filed on Nov. 3, 2016, which claims priority to Korean Patent Application No. 10-2016-0135790 filed on Oct. 19, 2016, the contents of which are herein incorporated by reference in their entireties.

BACKGROUND

1. Field

Exemplary embodiments of the present disclosure relate to a method and apparatus for analyzing hazard of the elevator control software system.

2. Description of the Related Art

The elevator is an apparatus installed in a high-rise building such as an apartment or a building and can easily pass through each floor. A passenger boarded inside the elevator selects an object floor to be moved using an operation panel installed on one side of the elevator.

The elevator operates through the control software. When the elevator is stopped due to a failure, the passenger in the elevator feels uneasy, and the passenger with anxiety may take dangerous actions such as forcibly opening the door. Ensuring safety is important because minor software faults can cause significant social and economic losses, and even life damage.

The importance of hazard analysis for ensuring the safety of control software driven systems is further emphasized. Hazard analysis is a series of activities that anticipate a dangerous situation and prevent the accident from occurring in advance. Specifically, hazard analysis is a series of processes by determining the hazards of accidents, assessing determined hazard, and conducting analyses of the causes and scenarios of hazards for securing safety before the accident occurs. Thus, in the hazard analysis, it is very important to analyze the causes and scenarios the accident occurrence.

CITATIONS (Non Patent Literature 1) Levenson, N. (2011). Engineering a safer world: Systems thinking applied to safety. Mit Press.

(Non Patent Literature 2) Levenson, N. (2004). A new accident model for engineering safer systems. Safety science, 42(4), 237-270.

(Non Patent Literature 3) Paternò, F., Mancini, C., & Meniconi, S. (1997, January). ConcurTaskTrees: A diagrammatic notation for specifying task models. In Human-Computer Interaction INTERACT'97 (pp. 362-369). Springer US.

(Non Patent Literature 4) Paternò, F. (2003). ConcurTaskTrees: an Engineered Notation for Task Models. The Handbook of Analysis for Human-Computer Interaction, Lawrence Erlbaum Associates, 483-500.

SUMMARY

Exemplary embodiments of the present disclosure provide a method of analyzing a hazard for minimizing omission of hazard detection and for increasing accuracy and completion of the hazard analysis.

In an exemplary embodiment of a method of analyzing a hazard of the elevator software control system by a computer according to the present disclosure, the method includes determining an attribute and function demands of the system; analyzing tasks of the system based on the determined attribute and the function demands; generating specification of a relation between the tasks using CTT (Concur Task Tree) method, the CTT method representing a hierarchical relation of a control flow between the tasks; and determining at least one of the hazard of the system based on the specification. The determining at least one of the hazard of the system uses a guide word mapping table of CTT based STPA. The structure of the elevator system is divided into an internal part and an external part; and the external part of the elevator system includes a summon button to summon the elevator and the summon button includes an up button and a down button; and the internal part of the elevator system includes a car where passengers board and a door and in the car, a floor request button, an open button and a close button are disposed.

In an exemplary embodiment, the determining the attribute and the function demands of the system may include comprising generating a use case diagram regarding the attribute and the function demands of the system.

In an exemplary embodiment, the method may further include generating a control structure map of the system based on the attribute and the function demands of the system prior to the analyzing the tasks of the system.

In an exemplary embodiment, the guide word mapping table of the CTT based STPA may include guide words defined by the STPA corresponding to the relation between the tasks which are defined by the CTT method In an exemplary embodiment of a method of analyzing a hazard of the elevator software control system by a computer according to the present disclosure, the method includes determining an attribute and function demands of the system; analyzing tasks of the system based on the determined attribute and the function demands; generating specification of a relation between the tasks using CTT (Concur Task Tree) method, the CTT method representing a hierarchical relation of a control flow between the tasks; and determining at least one of the hazard of the system based on the specification; and generating a safety constraint of the system based on the determined hazard. The determining at least one of the hazard of the system uses a guide word mapping table of CTT based STPA. The structure of the elevator system is divided into an internal part and an external part; and the external part of the elevator system includes a summon button to summon the elevator and the summon button includes an up button and a down button; and the internal part of the elevator system includes a car where passengers board and a door and in the car, a floor request button, an open button and a close button are disposed; and the internal part of the elevator system may include a load sensor to measure the load to be applied to the car.

In an exemplary embodiment, the Concur Task Tree (CTT) method may include an abstract task which is a superordinate task of the other tasks, a user task which is operated by the user, an application task operated by the system and an interaction task which is operated by interaction between the user and the system according to the characteristics of the tasks.

In an exemplary embodiment, abstract tasks including Summon Car, Boarding, Take Car to Destination Floor and Load weight, interaction tasks, which are operated by interaction between the user and the system, including Pressed Summon Button, Pressed Floor Request Button and Hold doors; application tasks, which are operated by the system, including Detect Car Position, Calculate Distance, Move Car, Stop Car, Open Doors, Check Changed Weight, Ring Alarm and Close Doors; user tasks, which are operated by the user, including Get into Car and Get off Car are generated.

In an exemplary embodiment of a hazard analysis apparatus of the elevator software control system based on STPA (System Theoretic Process Analysis) according to the present disclosure, the hazard analysis apparatus includes a demand determining part, a task analyzing part, a specification generating part, a hazard determining part and a safety constraint generating part. The demand determining part determines an attribute and function demands of the system. A task analyzing part configured to analyze tasks of the system based on the determined attribute and the function demands. A specification generating part configured to generate specification of a relation between the tasks using CTT (Concur Task Tree) method, the CTT method representing a hierarchical relation of a control flow between the tasks. A hazard determining part configured to determine at least one hazard of the system based on the specification. A safety constraint generating part configured generate a safety constraint of the system based on the determined hazard. The demand determining part further configured to generate a use case diagram regarding the attribute and the function demands of the system. The structure of the elevator system is divided into an internal part and an external part; and the external part of the elevator system includes a summon button to summon the elevator and the summon button includes an up button and a down button; the internal part of the elevator system includes a car where passengers board and a door and in the car, a floor request button, an open button and a close button are disposed.

In an exemplary embodiment, the Concur Task Tree (CTT) method may include an abstract task which is a superordinate task of the other tasks, a user task which is operated by the user, an application task operated by the system and an interaction task which is operated by interaction between the user and the system according to the characteristics of the tasks.

In an exemplary embodiment, the abstract tasks including Summon Car, Boarding, Take Car to Destination Floor and Load weight, interaction tasks, which are operated by interaction between the user and the system, including Pressed Summon Button, Pressed Floor Request Button and Hold doors; application tasks, which are operated by the system, including Detect Car Position, Calculate Distance, Move Car, Stop Car, Open Doors, Check Changed Weight, Ring Alarm and Close Doors; and user tasks, which are operated by the user, including Get into Car and Get off Car are generated.

In an exemplary embodiment of a computer readable recording medium comprising at least one command according to the present disclosure, the command implements the methods of claim 1 when the command is operated by a computer.

According to the present disclosure, the conventional and incomplete STPA may be compensated and the task analysis and the specification method using CTT may be added prior to detecting the hazard. Thus, accuracy and completion of the hazard analysis may be increased comparing to the conventional STPA.

BRIEF DESCRIPTION OF THE DRAWINGS

The above and other features and advantages of the present disclosure will become more apparent by describing in detailed exemplary embodiments thereof with reference to the accompanying drawings, in which:

FIG. 2a and FIG. 2b are CTT-based STPA guide word mapping tables according to an exemplary embodiment of the present disclosure;

FIG. 6 is a table illustrating exemplary tasks of the elevator software control system according to CTT;

FIG. 8 is a table illustrating determined hazards using guide word mapping table of CTT based STPA using the relations between the tasks of FIGS. 7(a) and 7(b); and FIG. 9 is a table illustrating exemplary safety constraints generated for the elevator software control system based on the predicted hazardous situations of FIG. 8 for control orders of the elevator software control system.

DETAILED DESCRIPTION OF THE DISCLOSURE

Figure 1:
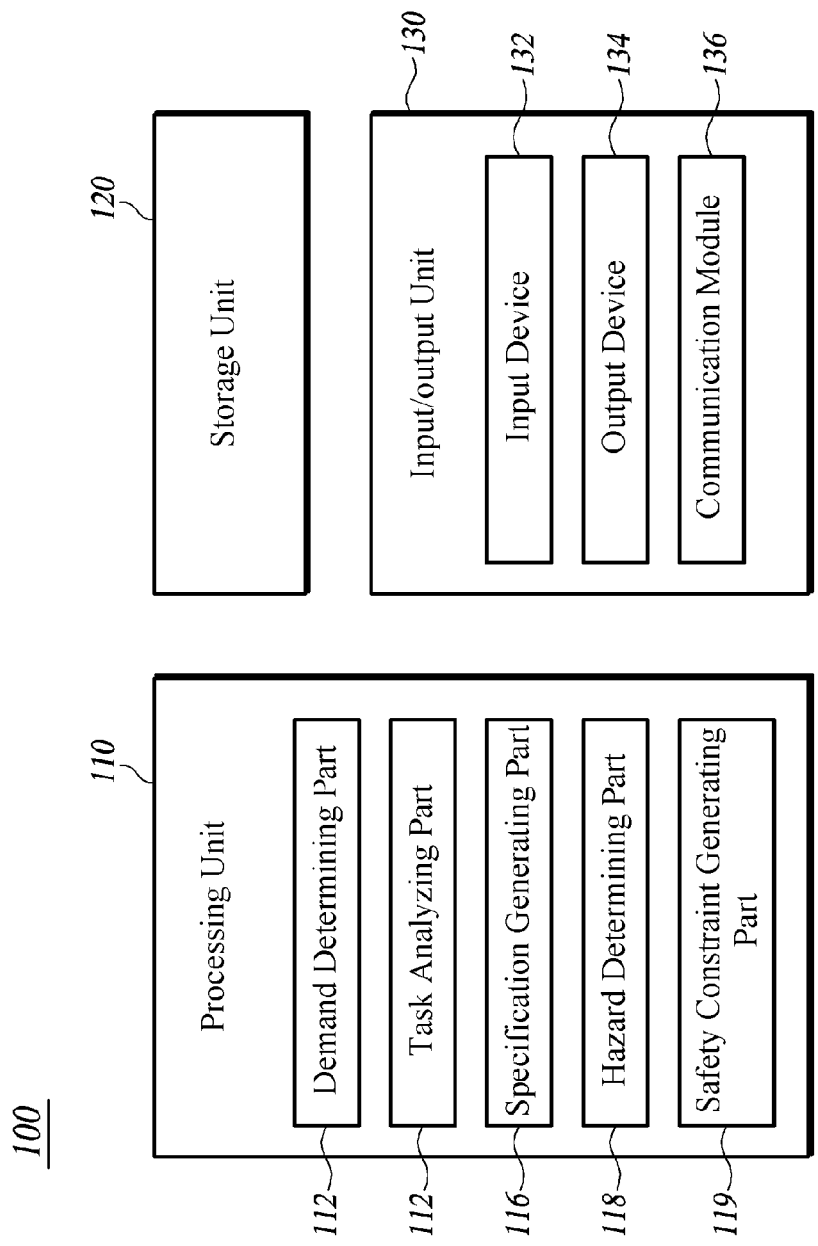
FIG. 1 is a conceptual diagram illustrating an exemplary software analysis apparatus for analyzing the hazard of an elevator software control system.

The present disclosure now will be described more fully hereinafter with reference to the accompanying drawings, in which exemplary embodiments of the present disclosure are shown. The present disclosure may, however, be embodied in many different forms and should not be construed as limited to the exemplary embodiments set forth herein.

Rather, these exemplary embodiments are provided so that this disclosure will be thorough and complete, and will fully convey the scope of the present subject matter to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the present subject matter unless otherwise claimed. No language in the specification should be construed as indicating any non-claimed element as essential to the practice of the disclosure as used herein.

Hereinafter, the present disclosure will be explained in detail with reference to the accompanying drawings.

The attributes (structures) of the elevator system which is the target system are divided into an internal part and an external part. The external part of the elevator system includes a summon button to summon the elevator. The summon button includes an up button and a down button. The internal part of the elevator system includes a car where passengers board and a door. In the car, a floor request button, an open button and a close button are disposed. The internal part of the elevator system may further include a load sensor to measure the load to be applied to the car.

FIG. 1 is a conceptual diagram illustrating an exemplary software analysis apparatus for analyzing the hazard of an elevator software control system.

As described above, in the exemplary embodiment, the software hazard analysis apparatus 100 may include a processing unit 110, a storage unit 120, and an input/output unit 130. The processing unit 110, the storage unit 120, and the input/output unit 130 are connected to each other (the connection is not shown in FIG. 1) to communicate with each other. The hazard analysis apparatus 100 may include a distributed processor and may be configured to perform the functions of each portion of the hazard analysis apparatus 100 (e.g., the processing unit 110, the storage unit 120, and the input/output unit 130). The software hazard analysis apparatus 100 may perform the operations associated with analyzing the hazard of the software.

The software hazard analysis apparatus 100 may include a processing unit 110. The processing unit 110 includes a demand determining part 112 configured to determine attributes and functional demands of the system, a task analyzing part 114 configured to analyze tasks of the system based on the determined attributes and the function demands; A specification generating part 116 configured to generate specification of a relation between the tasks using CTT (Concur Task Tree) method, the CTT method representing a hierarchical relation of a control flow between the tasks; A hazard determining part 118 configured to determine at least one hazards of the system based on the specification; and a safety constraint generating part 119 configured to generate a safety constraint of the system based on the determined hazard.

The processing unit 110 described above may be implemented as a hardware platform based on at least one of application specific integrated circuits (ASICs), digital signal processors (DSPs), digital signal processing devices (DSPDs), programmable logic devices (PLDs), field-programmable gate arrays (FPGAs), processors, controllers, micro-controllers, and microprocessors. The processing unit 110 may also be implemented as a firmware/software module executable on the hardware platform described above. In this case, the software module may be implemented by a software application written in an appropriate program language. The processing unit 110 may include one or memory modules configured to store data or instructions related to one or more other constituent elements.

The demand determining part 112, the task analyzing part 114, the specification generating part 116, the hazard determining part 118, and the safety constraint generating part 119 may be program modules that may be stored in the one or more memory modules and may be executed by the one or more processors. The program modules may be in the form of operating systems, application program modules, or other program modules, while they may be physically stored on a variety of commonly known storage devices. Such program modules may include, but not limited to, routines, subroutines, programs, objects, components, instructions, data structures, and the like for performing specific tasks or executing specific abstract data types as will be described below in accordance with the present disclosure.

The software hazard analysis apparatus 100 may further include a storage unit 120. In an exemplary embodiment, the storage unit 120 may include a database that includes a plurality of tables. In one embodiment, the plurality of tables used for software hazard analysis may include a CTT-based STPA guide word mapping table. In one embodiment, each of the plurality of tables may comprise a plurality of records.

The software hazard analysis apparatus 100 may have additional features/functions. For example, software hazard analysis apparatus 100 may include additional storage devices (removable storage devices and/or non-removable storage devices), including, but not limited to, magnetic or optical disks, tape, flash, or smart card. The computer storage media, such as memory, includes volatile and non-volatile, removable and non-removable media implemented in any method or technology for storage of information such as computer readable instructions, data structures, program modules or other data. The computer storage media may be any type of storage medium such as RAM, ROM, EEPROM, flash memory or other memory technology, CD-ROM, DVD, or other optical storage devices, magnetic cassettes, magnetic tape, magnetic disk storage or other magnetic storage devices, or any other medium that can be used to store the desired information and which can be accessed by the hazard analysis apparatus 100. Any such computer storage medium may be part of the hazard analysis apparatus 100.

The software hazard analysis apparatus 100 may further include an input/output unit 130. The input/output unit 130 may provide and/or receive components as described above, which are used to analyze the software. The input/output unit 130 can exchange data with another system, a storage device, and/or a data stream. The input/output unit 130 may receive inputs for various types of software analysis and may provide analysis results to various types of software analysis. In one embodiment, the input/output unit 130 may include an input device 132 such as a keyboard, a mouse, a pen, a voice input device, a touch input device, and the like.

The input/output unit 130 may include a output device 134, such as displays, speakers, printers, and the like.

Input/output unit 130 may further include communication module 136 for allowing itself to communicate with other devices. The communication module 136 is an example of a communication medium. By way of example, and not limitation, communication medium includes wired media such as a wired network or direct-wired network, and wireless media such as acoustic, RF, infrared and other wireless media. The term computer readable media as used herein includes both storage medium and communication medium.

While various embodiments of software hazard analysis are expected to be particularly suited for computerized systems, they are not intended to limit the scope of the present disclosure. Conversely, as used herein, the term "computer system" refers to a computer system that stores and processes information to control the operation and execution of the device itself, whether or not the device is actually electronic, mechanical, logical, or virtual and/or any and all devices capable of utilizing stored information.

FIG. 2a and FIG. 2b are CTT-based STPA guide word mapping tables according to an exemplary embodiment of the present disclosure.

The guide word mapping table of CTT based STPA includes the guide words of the STPA which are applicable to the relation of the tasks of CTT. Herein, the guide words include "Not Providing" which means that a control order to be operated is not operated, "Providing Causes" which means that an inaccurate or unsafe control order is operated, "(Provide) Too Late or Too Early" which means that a control order is operated late or early comparing to a proper time for the control order and "(Stopped) Too soon or (Applied) Too Long" which means that a control order is stopped earlier than a proper time or the control order is applied longer than a proper time. Referring to the guide word mapping table of CTT based STPA, the unsafe control order of the system may be determined and the hazardous situation generated when the tasks (e.g. T1 and T2) are not intentionally performed may be systematically determined.

Figure 3:
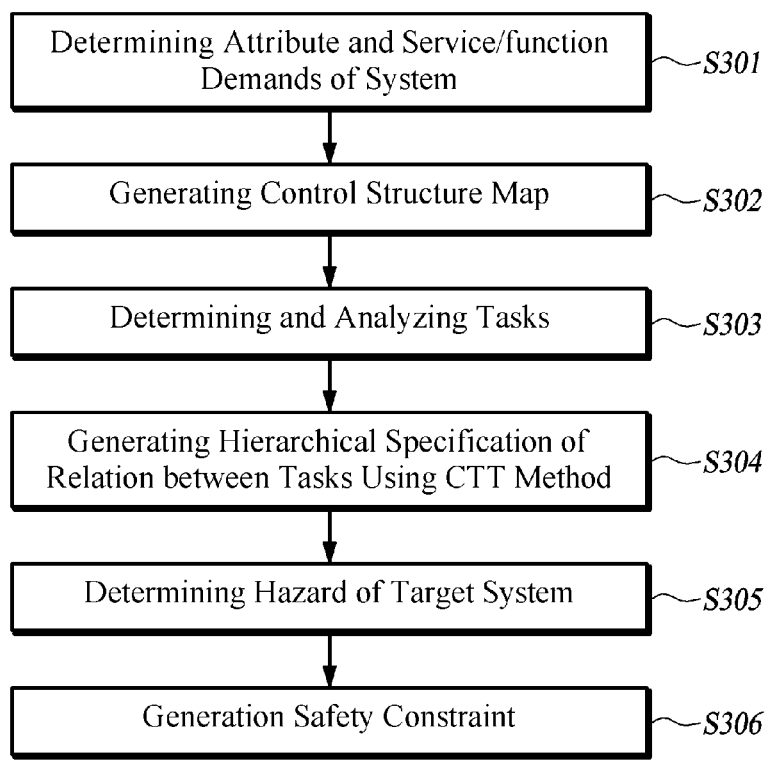
FIG. 3 is a flow block diagram illustrating processes for analyzing a hazard of the elevator software control system according to an exemplary embodiment of the present disclosure.

FIG. 3 is a flow block diagram illustrating processes for analyzing a hazard of the elevator software control system according to an exemplary embodiment of the present disclosure;

Referring to FIG. 3, an attribute (a structure) and service/function demands of the elevator control system are determined (in step 301) and a control structure map of the system is generated based on the determined demands (in step 302). According to the control structure map, input of software of the target system and a sequential flow of data of the target system may be concisely determined.

Figure 4:
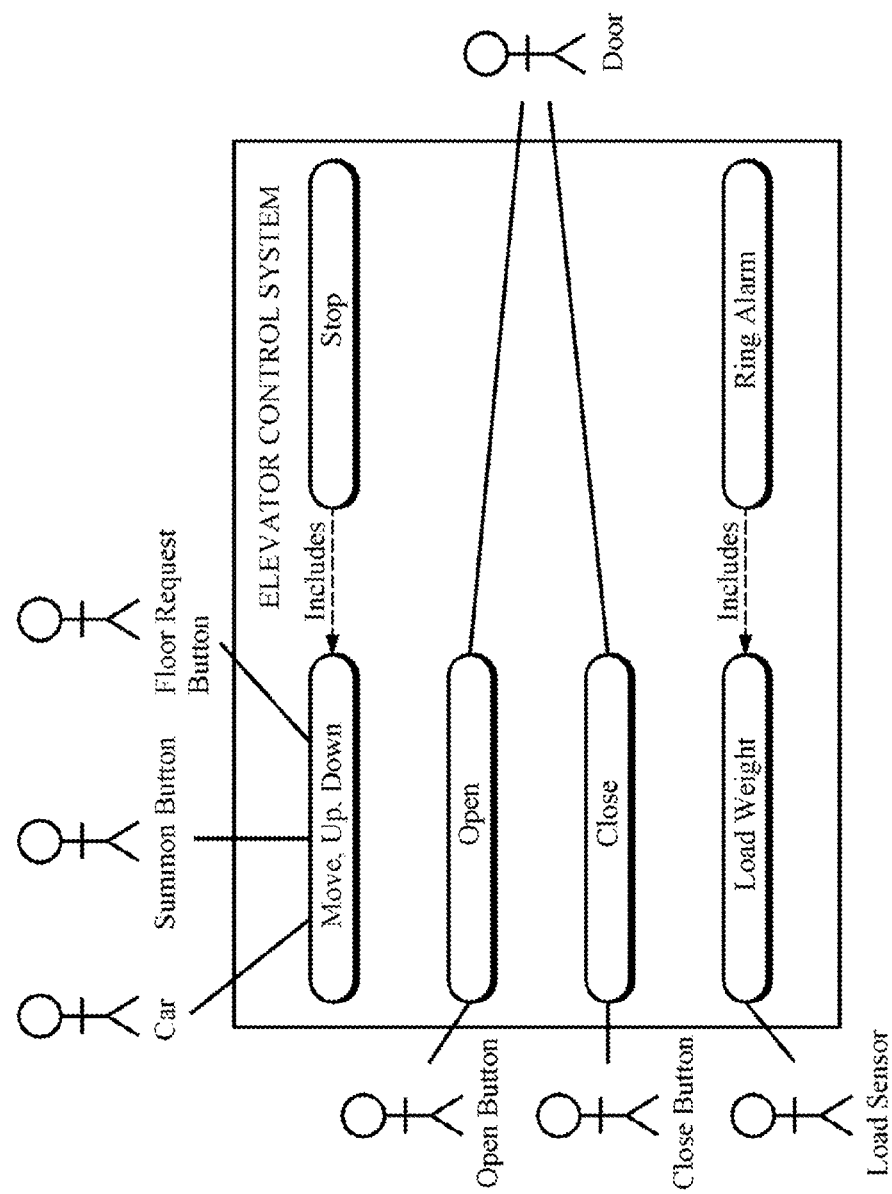
FIG. 4 is a conceptual diagram illustrating a use case diagram of an elevator software control system according to an exemplary embodiment of the present disclosure.

Step S301 will be described with reference to FIG. 4. FIG. 4 is a conceptual diagram illustrating a use case diagram of an elevator control system according to an exemplary embodiment of the present disclosure.

In order to hazard analysis of an elevator control system, for example, the attribute and the service/function demands of the elevator control system are determined using the use case diagram and the control structure map may be generated.

FIG. 4 illustrates the use case diagram representing the attributes and the service/function demands of the elevator control system according to the present exemplary embodiment.

The use case means the service/function demands of the target system which is determined in a viewpoint of a user. The use case diagram is one of specification methods of the system demands. The use case diagram illustrates the use cases, which are the service/function demands of the software control system which is determined in the viewpoint of the user, with attributes related to the use cases such as the user and/or external factors. When the system demands of the system is illustrated using the use case diagram, the service/function demands of the target system which is determined in the viewpoint of the user and the functions performed by the target system may be clearly determined. Those skilled in the art understand a method of generating the use case diagram so that the detailed explanation regarding the method is omitted.

Referring to FIG. 4, the services/functions provided by the elevator control system which is the use cases of the elevator control system includes six cases including "Move (Up and Down)" to move the car in an upper direction or in a lower direction, "Stop" to stop the car on a destination floor, "Open" to open the door of the car, "Close" to close the door of the car, "Load Weight" to measure the load applied to the car when the passenger boards on the car to control the load of the car under a restricted load of the car, and "Ring Alarm" to ring an alert alarm when the load of the car exceeds the restricted load of the car. In the use case diagram of FIG. 4, the above explained use cases are represented with the related attributes such as the summon button, the car, the floor request button, the open button, the close button, the load sensor and the door.

The step S302 will be described with reference to FIG. 5.

Figure 5:
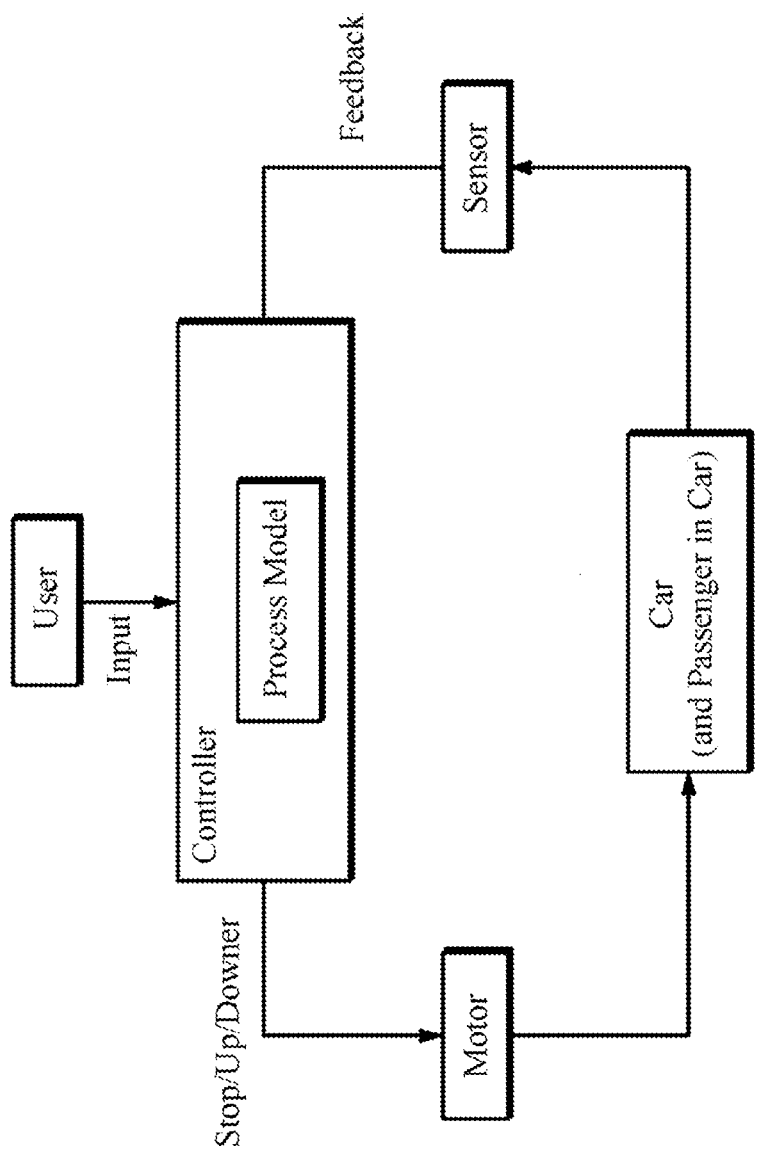
FIG. 5 is a conceptual diagram illustrating a control structure map formed based on the use case diagram of the elevator software control system of FIG. 4.

FIG. 5 is a conceptual diagram illustrating the control structure map formed based on the use case diagram of the elevator control system of FIG. 4.

According to an exemplary embodiment, the control structure map may include a user, an input from the user, a controller (a process model), a control order from the controller, an actuator receiving the control order, a processor controlled by the actuator, a sensor sensing the controlled processor and a feedback from the sensor to the controller. For example, referring to FIG. 3 regarding the elevator control system of the present exemplary embodiment, the control structure map represents control flows including transmitting the control order such as Stop, Up or Down from the controller which is generated by the user input to the motor, stopping the car or moving the car in the designated direction by an operation of the motor which receives the control order, and sensing the stop or the movement of the car by the sensor and sending a feedback order from the sensor to the controller.

Next, in step S303, based on determined demands and control structure map which are determined in step S301 and S303, tasks of the elevator software control system are determined and analyzed. In step 304, hierarchical specification of the relation between the tasks is generated using CTT (Concur Task Tree) method. The task means a unit work processed by the system. In CTT, the task means the unit work of a series of works operated in the system by the user. CTT method is used for a customized task modeling for a user interface model based system design. CTT method is used for bidirectional system design between the user and an application. CTT includes relations between the tasks and visualizes characteristics of the tasks of the system and an order (a system working flow) of the tasks in the system flow. In CTT, the tasks are divided into an abstract task which is a superordinate task of the other tasks, a user task which is operated by the user, an application task operated by the system and an interaction task which is operated by interaction between the user and the system according to the characteristics of the tasks.

FIG. 6 is a table illustrating exemplary tasks of the elevator control system according to CTT.

As explained referring to the step S303 and S304 of FIG. 3, to analyze the hazard of the elevator control system, the tasks of the elevator control system are analyzed and the hierarchical specification of the relation between the tasks is generated using CTT. Referring to FIG. 6, four abstract tasks, which are the superordinate tasks of the other tasks, including Summon Car, Boarding, Take Car to Destination Floor and Load weight, three interaction tasks, which are operated by interaction between the user and the system, including Pressed Summon Button, Pressed Floor Request Button and Hold doors, eight application tasks, which are operated by the system, including Detect Car Position, Calculate Distance, Move Car, Stop Car, Open Doors, Check Changed Weight, Ring Alarm and Close Doors and two user tasks, which are operated by the user, including Get into Car and Get off Car are generated.

Figure 7A:
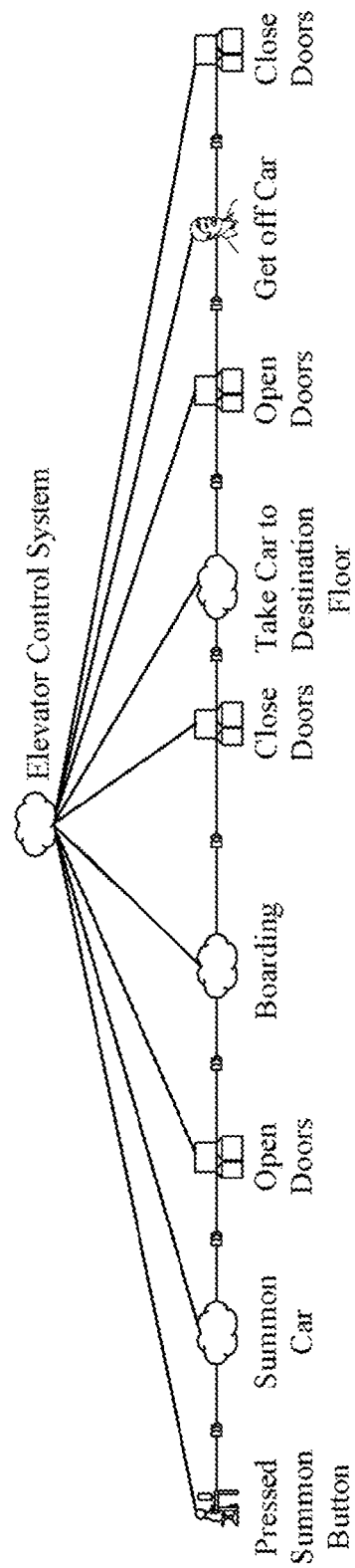
FIGS. 7(a) and 7(b) are conceptual diagram illustrating relations between the tasks of FIG. 6 according to specification according to CTT.
Figure 7B:
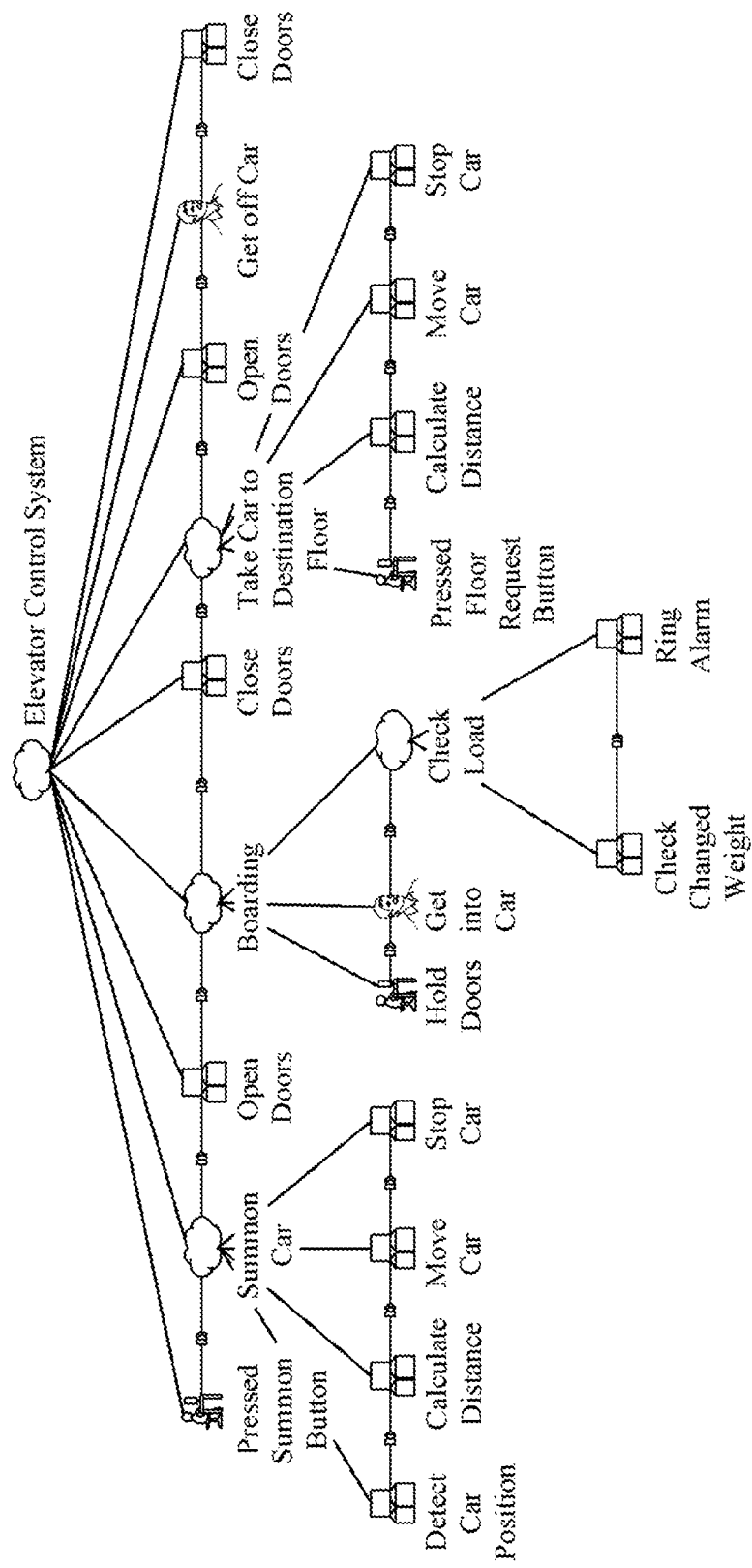

FIGS. 7(a) and 7(b) are conceptual diagram illustrating relations between the tasks of FIG. 1 according to the specification according to CTT. FIG. 7(a) represents the tasks of the elevator control system as a hierarchical structure. FIG. 7(b) represents the tasks of the elevator control system as the hierarchical structure in detail. According to the FIGS. 7(a) and 7(b), the relations between the tasks in the system flow may be easily understandable.

Referring to FIG. 7(a), in the elevator control system operation, Pressed Summon Button task and Summon Car task are occurred. The Pressed Summon Button task and the Summon Car task may have a relation of Enabling with Information passing according to the specification of CTT so that the second task (Summon Car) cannot start until the first task (Pressed Summon Button) is completed and the information of the first task (Pressed Summon Button) must be inputted to the second task (Summon Car).

Referring to FIG. 7(a), after the Summon Car task is performed, Open Doors task is performed and then Boarding task is occurred. After the Boarding task is performed, Close Doors task, Take Car to Destination Floor task, Open Doors task, Get off Car task and the Close Doors task may be sequentially performed. As shown in FIG. 5(a), the above mentioned tasks having the relation of Enabling of CTT so that the second task (Boarding) cannot start until the first task (Open Doors) is completed. Similarly, the Close Doors task cannot start until the Boarding task is completed and the Take Car to Destination Floor task cannot start until the Close Doors task is completed.

Referring to FIG. 7(b), the Summon Car task may be an abstract task including Detect Car Position task to detect a present position of the car, Calculate Distance task to calculate a distance between the present position of the car and the destination floor, Move Car task to move the car and Stop Car task to stop the car at the destination floor. Herein, the Detect Car Position task and the Calculate Distance task may have a relation of Enabling with Information passing according to the specification of CTT so that the Calculate Distance task cannot start until the Detect Car Position task is completed and the information (e.g. the detected present position of the car) of the Detect Car Position task must be inputted to the Calculate Distance task. Similarly, the Calculate Distance task and the Move Car task may have a relation of Enabling with Information passing according to the specification of CTT so that the Move Car task cannot start until the Calculate Distance task is completed and the information (e.g. the distance value) of the Calculate Distance task must be inputted to the Move Car task. The Move Car task and the Stop Car task may have a relation of Enabling so that the Stop Car task cannot start until the Move Car task is completed.

In addition, the Boarding task includes Hold Doors task, Get into Car task and Check Load task. The Hold Doors task, the Get into Car task and the Check Load task may have a relation of Concurrent tasks (interleaving). The tasks in the relation of Concurrent tasks (interleaving) can be performed at any order and other tasks must be performed until one task is completed. More specifically, the Check Load task may include Check Changed Weight task and Ring Alarm task. The Check Changed Weight task and the Ring Alarm task may have a relation of Enabling with Information passing according to the specification of CTT.

In addition, the Take Car to Destination Floor task may include Pressed Floor Request Button, the Calculate Distance task, the Move Car task and the Stop Car task. Referring to FIG. 6(b), the Pressed Floor Request Button, the Calculate Distance task and the Move Car task may have a relation of Enabling with Information passing and the Move Car task and the Stop Car task may have a relation of Enabling.

The above explained four kinds of the tasks are represented by correlation between tasks T1 and T2. Accordingly, the system work flow may be easily determined. https://www.w3.org/2012/02/ctt/ may include the detailed explanation of CTT method.

Next, in step S305, the hazard of the elevator software control system is determined based on the specification of the tasks created utilizing the CTT in step S304. According to an embodiment of the disclosure, the determination of the hazard in the elevator software control system can be done, for example, by utilizing the CTT-based STPA guide word mapping table defined in FIG. 6.

FIG. 8 is a table illustrating determined hazards using guide word mapping table of CTT based STPA.

The guide word mapping table of CTT based STPA includes the guide words of the STPA which are applicable to the relation of the tasks of CTT. Herein, the guide words include "Not Providing" which means that a control order to be operated is not operated, "Providing Causes" which means that an inaccurate or unsafe control order is operated, "(Provide) Too Late or Too Early" which means that a control order is operated late or early comparing to a proper time for the control order and "(Stopped) Too soon or (Applied) Too Long" which means that a control order is stopped earlier than a proper time or the control order is applied longer than a proper time. Referring to the guide word mapping table of CTT based STPA, the unsafe control order of the system may be determined and the hazardous situation generated when the tasks (e.g. T1 and T2) are not intentionally performed may be systematically determined.

Next, in step S306, a safety constraint is created in consideration of each of the determined hazards. Here, safety constraints represent demands for things that the system should not do, unlike the existing software development demands.

FIG. 8 is a table illustrating the determined hazards using the guide word mapping table of CTT based STPA using the relations between the tasks of FIGS. 7(a) and 7(b).

As explained referring to the block S305 of FIG. 3, the hazard of the target system is determined based on the specification of the tasks using CTT, after the task analysis and the hierarchical specification using CTT. Referring to FIG. 8, the control orders of the elevator control system according to the present exemplary embodiment including Stop, Open, Load Weight, Ring Alarm and Close and the hazards related to the control orders are represented according to the guide word mapping table of CTT based STPA in TABLE 2.

Referring to FIG. 8, for example, the task relation related to the safety regarding the Stop order may be Move Car>>Stop Car (Enabling of CTT) and the hazardous situation related to the task relation of Move Car>>Stop Car may be "Not Providing": the car is not stopped when the car is arrived at the destination floor or "(Provide) Too Late or Too Early": the car is stopped before the car is arrived at the destination floor. The task relation related to the safety regarding the Open order may be Stop Car>>Open doors (Enabling of CTT). The hazardous situation related to the task relation of Stop Car>>Open doors may be "Not Providing": the doors are opened before the car is stopped or the doors are not opened when the car is stopped or "(Provide) Too Late or Too Early": the doors are opened before the car is completely stopped. The task relation related to the safety regarding the Open (Hold), when the Open order is held with the doors opened, may be Hold Doors III Get into Car (Concurrent Tasks (Interleaving)). The hazardous situation related to the task relation of Hold Doors III Get into Car may be "Not Providing": the open status of the doors is not held when the passengers get into the car (the hold status is released when boarding). The task relations to be considered regarding the orders and the hazardous situations related to the task relations are further illustrated in FIG. 8.

FIG. 9 is a table illustrating exemplary safety constraints generated for the elevator control system based on the predicted hazardous situations of FIG. 8 for the control orders of the elevator control system.

As explained referring to the block S306 of FIG. 3, after the hazards are determined, the safety constraints considering each determined hazard is generated. Referring to FIG. 9, the safety constraints to prevent the hazards regarding the control orders including Stop, Open, Load Weight, Ring Alarm and Close are represented. Herein, the safety constraint means the demands not to be performed in the control system to prevent the hazard. The safety constraints may be generated considering the determined and analyzed hazardous situations in FIG. 8.

The foregoing is illustrative of the present disclosure and is not to be construed as limiting thereof. Although a few exemplary embodiments of the present disclosure have been described, those skilled in the art will readily appreciate that many modifications are possible in the exemplary embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific exemplary embodiments disclosed, and that modifications to the disclosed exemplary embodiments, as well as other exemplary embodiments, are intended to be included within the scope of the appended claims. The present disclosure is defined by the following claims, with equivalents of the claims to be included therein. In addition, the various technical features in the present disclosure may be implemented by hardware, software, or a combination of hardware and software. Accordingly, a specific part of the method of analyzing the hazard of the control software driving system may be formed as at least one of computer programs executable by a general purpose microprocessor, a dedicated microprocessor and a microcontroller. The computer program according to the present exemplary embodiments may be stored in one of storing mediums including a non-volatile memory such as EPROM, EEPROM and a flash memory device, an internal hard disk and a detachable disk, a magnetic disk, a magnetooptic disk and a CD disk. In addition, the program codes may be written in an assembly language or a machine language. The program codes may be transmitted by one of transmitting mediums including an electric wiring, a cable, and an optical fiber and so on.

What is claimed is:

1. A method of analyzing a hazard of an elevator software control system by a computer, the method comprising:
   determining an attribute and function demands of the elevator software control system;
   analyzing tasks of the elevator software control system based on the determined attribute and the function demands;
   generating specification of a relation between the tasks using Concur Task Tree (CTT) method, the CTT method representing a hierarchical relation of a control flow between the tasks; and
   determining at least one of the hazard of the elevator software control system based on the specification,
   wherein the determining at least one of the hazard of the elevator software control system uses a guide word mapping table of CTT based System Theoretic Process Analysis (STPA), and
   wherein the structure of the elevator software control system is divided into an internal part and an external part; the external part of the elevator software control system includes a summon button to summon an elevator and the summon button includes an up button and a down button; and the internal part of the elevator software control system includes a car where passengers board and a door, and a floor request button, an open button and a close button are disposed in the car.

2. The method of claim 1, wherein the determining the attribute and the function demands of the elevator software control system comprises generating a use case diagram regarding the attribute and the function demands of the elevator software control system.

3. The method of claim 2, further comprising generating a control structure map of the elevator software control system based on the attribute and the function demands of the elevator software control system prior to the analyzing the tasks of the elevator software control system.

4. The method of claim 1,
   wherein the guide word mapping table of the CTT based STPA comprises guide words defined by the STPA corresponding to the relation between the tasks which are defined by the CTT method.

5. A method of analyzing a hazard of an elevator software control system by a computer, the method comprising:
   determining an attribute and function demands of the elevator software control system;
   analyzing tasks of the elevator software control system based on the determined attribute and the function demands;
   generating specification of a relation between the tasks using Concur Task Tree (CTT) method, the CTT method representing a hierarchical relation of a control flow between the tasks;
   determining at least one of the hazard of the elevator software control system based on the specification; and generating a safety constraint of the elevator software control system based on the determined hazard, wherein the determining at least one of the hazard of the elevator software control system uses a guide word mapping table of CTT based System Theoretic Process Analysis (STPA), and wherein the structure of the elevator software control system is divided into an internal part and an external part; the external part of the elevator software control system includes a summon button to summon an elevator and the summon button includes an up button and a down button; the internal part of the elevator software control system includes a car where passengers board and a door, and a floor request button, an open button and a close button are disposed in the car; and the internal part of the elevator software control system includes a load sensor to measure a load to be applied to the car.

6. The method of claim 5, wherein the CTT method includes an abstract task which is a superordinate task of other tasks, a user task which is operated by a user, an application task operated by the elevator software control system and an interaction task which is operated by interaction between the user and the elevator software control system according to characteristics of the tasks.

7. The method of claim 6, wherein abstract tasks including Summon Car, Boarding, Take Car to Destination Floor and Load weight are generated;
interaction tasks, which are operated by interaction between the user and the elevator software control system, including Pressed Summon Button, Pressed Floor Request Button and Hold doors are generated; application tasks, which are operated by the elevator software control system, including Detect Car Position, Calculate Distance, Move Car, Stop Car, Open Doors, Check Changed Weight, Ring Alarm and Close Doors are generated; and user tasks, which are operated by the user, including Get into Car and Get off Car are generated.

8. A apparatus for analyzing a hazard of an elevator software control system based on System Theoretic Process Analysis (STPA), the apparatus comprising:
a hardware processor;
a demand determining part stored in a non-transitory computer readable recording medium configured to determine an attribute and function demands of the elevator software control system;
a task analyzing part stored in the non-transitory computer readable recording medium configured to analyze tasks of the elevator software control system based on the determined attribute and the function demands;
a specification generating part stored in the non-transitory computer readable recording medium configured to generate specification of a relation between the tasks using Concur Task Tree (CTT) method, the CTT method representing a hierarchical relation of a control flow between the tasks;
a hazard determining part stored in the non-transitory computer readable recording medium configured to determine at least one hazard of the elevator software control system based on the specification and the STPA; and a safety constraint generating part stored in the non-transitory computer readable recording medium configured generate a safety constraint of the elevator software control system based on the determined hazard, wherein the demand determining part further configured to generate a use case diagram regarding the attribute and the function demands of the elevator software control system; and wherein the structure of the elevator software control system is divided into an internal part and an external part; the external part of the elevator software control system includes a summon button to summon an elevator and the summon button includes an up button and a down button; and the internal part of the elevator software control system includes a car where passengers board and a door, and a floor request button, an open button and a close button are disposed in the car.

9. The apparatus of claim 8, wherein the CTT method includes an abstract task which is a superordinate task of other tasks, a user task which is operated by a user, an application task operated by the elevator software control system, and an interaction task which is operated by interaction between the user and the elevator software control system according to characteristics of the tasks.

10. The apparatus of claim 9, wherein abstract tasks including Summon Car, Boarding, Take Car to Destination Floor and Load weight are generated; interaction tasks, which are operated by interaction between the user and the elevator software control system, including Pressed Summon Button, Pressed Floor Request Button and Hold doors are generated; application tasks, which are operated by the elevator software control system, including Detect Car Position, Calculate Distance, Move Car, Stop Car, Open Doors, Check Changed Weight, Ring Alarm and Close Doors are generated; and user tasks, which are operated by the user, including Get into Car and Get off Car are generated.

11. A non-transitory computer readable recording medium comprising at least one command, the command implementing the method of claim 1 when the command is operated by a computer.

12. The non-transitory computer readable recording medium of claim 11, wherein the determining the attribute and the function demands of the elevator software control system comprises generating a use case diagram regarding the attribute and the function demands of the elevator software control system.

13. The non-transitory computer readable recording medium of claim 12, the method further comprises generating a control structure map of the elevator software control system based on the attribute and the function demands of the elevator software control system prior to the analyzing the tasks of the elevator software control system.

14. The non-transitory computer readable recording medium of claim 11,
wherein the guide word mapping table of the CTT based STPA comprises guide words defined by the STPA corresponding to the relation between the tasks which are defined by the CTT method.

* * * * *